Aug. 21, 1923.  1,465,573
C. F. BAILEY
KILN FOR FIRING POTTERY AND OTHER WARE
Filed Sept. 22, 1922  2 Sheets-Sheet 2

Inventor.
Charles F. Bailey,
by Herbert W. Jenner,
Attorney.

Patented Aug. 21, 1923.

1,465,573

UNITED STATES PATENT OFFICE.

CHARLES FREDERICK BAILEY, OF LAWTON, CHESTER, ENGLAND.

KILN FOR FIRING POTTERY AND OTHER WARE.

Application filed September 22, 1922. Serial No. 589,805.

*To all whom it may concern:*

Be it known that I, CHARLES FREDERICK BAILEY, subject of the King of Great Britain and Ireland, and resident of Greenbank, Lawton, in the county of Chester, England, earthenware manufacturer, have invented certain new and useful Improvements in Kilns for Firing Pottery and Other Ware (for which I have filed application in Great Britain by application for Patent No. 24,874, dated the 20th day of September, 1921), of which the following is a specification.

My invention relates to improvements in kilns for firing pottery and other ware, the object being means to enable a great quantity of ware to be expeditiously and economically treated or fired.

My invention consists essentially in the use of three kilns built integral side by side, all the three kilns being heated by the circulation of heat or flame from a series of fires arranged on each outer kiln; and means for expeditiously cooling down the ware after the firing thereof.

My invention will be fully described with reference to the accompanying drawings, in which:—

Fig. 3 is a sectional elevation of a detail to be referred to.

Figure 1:
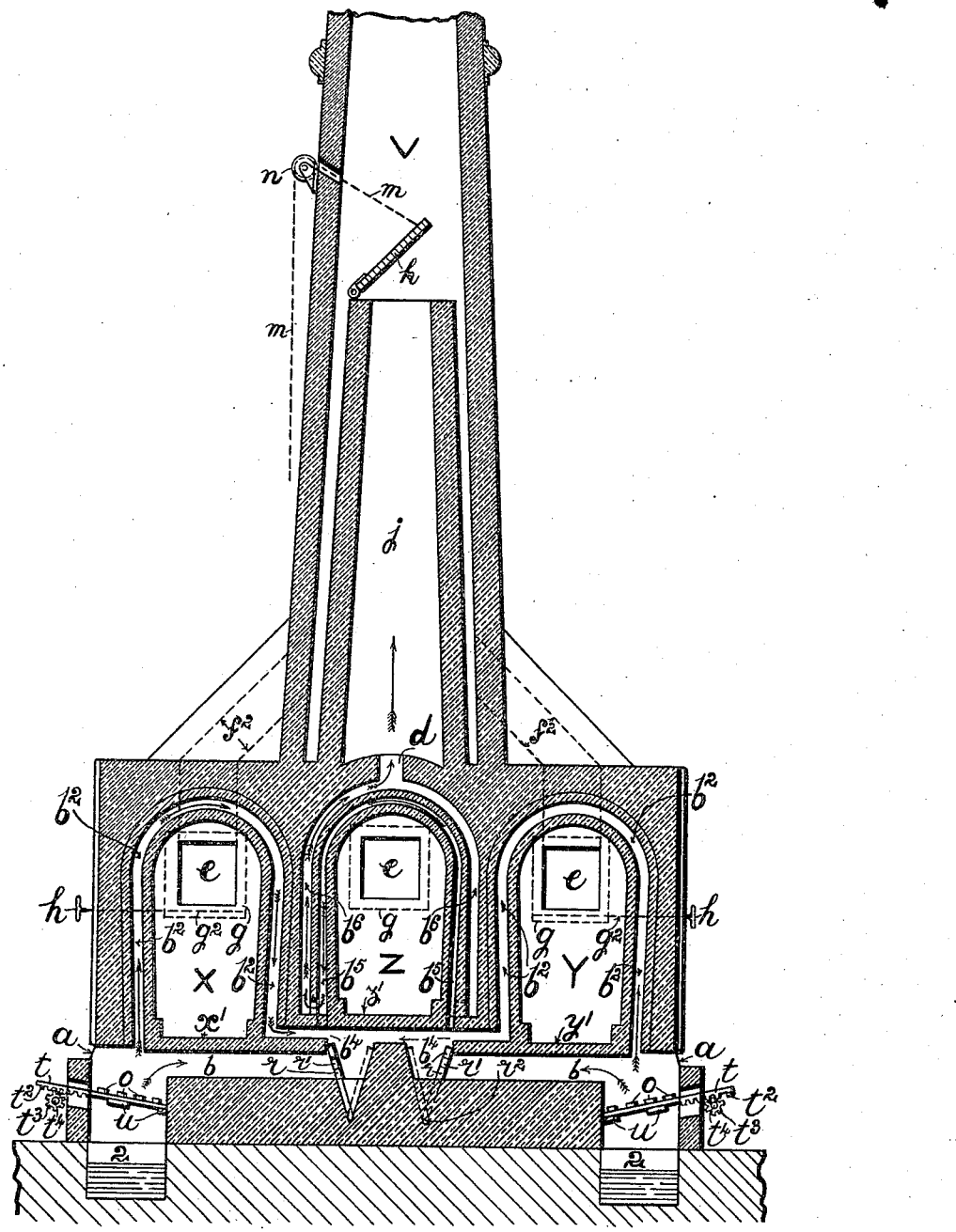
Fig. 1 is a sectional elevation of my improved kiln.

According to my said invention I employ three kilns X, Y and Z, formed integral and arranged approximately on the same ground level, fireplaces $a$ being situated at suitable intervals along the two outer kilns X and Y. The flame or heat from each fireplace $a$ normally passes through horizontal flues $b$ directly underneath the floor $x^1$ and $y^1$ of each of the two outer kilns X and Y whilst other flame or heat from the fireplaces $a$ passes upward through and around flues $b^2$ formed round the wall of each of the outer kilns X and Y being then joined into one horizontal flue $b^4$ underneath the floor $z^1$ of the middle kiln Z after which it is directed round the flue $b^5$ of the middle kiln Z and then up an outer flue $b^6$ up an exit flue $d$ at the top, the heat passing into a cone or conduit $j$ arranged in the main chimney V said cone $j$ being provided with an adjustable damper $k$ which may be closed by operating a chain $m$ or the like passing over guide pulley $n$ to retain the heat in the conduit $j$ whilst all the three kilns X Y Z are cooling down, the stored up heat in the cone $j$ and in the brickwork being of great value for the next firing of the kiln. When the damper $k$ on the cone $j$ is opened as shown on the drawings, the heat which has been well circulated through the three kilns X Y Z is free to pass into the main kiln chimney V. The horizontal flues $b$ underneath each side of kiln X and Y hereinafter referred to are extended at $b^4$ underneath the central kiln Z but in order to direct the heat first through the flues $b^2$ in the walls of the two outer kilns X and Y through the flue $b^4$ and then underneath the floor $z^1$ of the inner kiln Z and through flues $b^5$ and $b^6$ into the cone $j$, adjustable dampers $r$ are provided in the horizontal flues $b$ to normally limit or control the flame passing directly from the fireplaces $a$ causing the other flame to pass up and around the flues $b^2$ round the outer kilns and around the inner kiln Z as before stated. The dampers $r$ are hinged or pivotally mounted at their lower ends $r^2$ on suitable rods (not shown) extending to the outside of the kiln, such rods being partly rotated to open or close the dampers $r$. The hole or passage $r^1$ in such damper $r$ is for the purpose of allowing the travel of a sufficient quantity of flame or very hot air to mix with the hot air which has been partly spent in its passage around the outer kilns X and Y and is passing down the flue $b^2$ as it is entering into the flue $b^4$ such air then passing around the flue $b^5$ and then up the flue $b^6$ to the exit flue $d$. The said heat controlling dampers $r$ may be opened when desired to allow the flame or heat from the fires a more direct passage along all the horizontal flues $b$ and $b^4$ underneath the floor of the three kilns X Y Z.

Each of the three kilns X Y Z has an opening $e$ provided with a controllable damper $g$ the opening $e$ in each side kiln X and Y communicating with separate conduits $f^2$ to convey the heat after circulation and utilization into the main chimney V outside the cone or conduit $j$. The heat from centre kiln Z passes through opening $e$ and is directed into the main chimney V. The said damper $g$ is hinged at its lower side $g^2$ and operated by partly rotating a rod $h$ (Fig. 1) to move it to close either of the side kilns X or Y, or the middle kiln Z, the particular opening $e$ at the back of the kiln Z being also controlled by a damper $g$. If desired the dampers $g$ for the two outer kilns X and Y may rest in a socket $g^3$ and be operated by a rod $g^4$ extending through a hole $g^5$ in the wall of the conduit $f^2$ as shown at Fig. 2. The dampers $g$ could be operated by a chain (not shown) or other convenient means.

By circulating the flame or heat round the three kilns as described a great intensity of heat is obtained therein and expeditious firing of the ware is accomplished.

During the firing of the ware placed in each of the three kilns X Y Z the damper $g$ over each opening $e$ therein (see enlarged view Fig. 2) is kept closed but after the firing has been completed and it is desired to "cool down" the ware all the dampers $g$ are opened to allow the egress of the heat from the interior of each kiln to the kiln chimney V. A quantity of heat may be collected in the cone $j$ by closing the damper $k$ thereof prior to opening the damper $g$ in the kiln Z, the stored up heat in the said cone $j$ then being of great value for the next firing of the kilns.

To expedite the "cooling down" of the ware in all the three kilns after firing is accomplished I arrange for the displacement of the firegrates to dislodge the burning fuel. For this purpose the fire bars $o$ are carried on an inclined slidable frame $t$ which rests on fixed bearers $u$. The said slidable frame $t$ extends longitudinally of each fire-place $a$ and has two or more racks $t^2$ to engage pinions $t^3$ secured to rotatable shafts $t^4$ rotatable in bearings (not shown) fixed on the kiln. By the rotation of the shaft $t^4$, the pinions $t^3$ slide the frame $t$ carrying the fire bars $o$, the fuel thereon falling into the ash-hole 2, water therein extinguishing the fires. When the fires are extinguished, the damper $k$, on the top of the cone or conduit $j$, is closed so as to retain the maximum amount of heat for the next firing.

Figure 3:
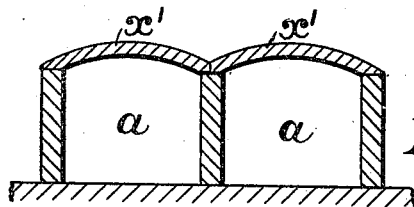

The bottom of the outer kilns X and Y or the top of the mouths or firegrates $a$ are constructed without the usual central midfeather commonly employed to support the quarries at the top of the horizontal flues $b$ and which soon burn out and allow the quarries to fall. In my improved kiln I construct the underside of the two outer kiln bottoms, $x^1$ and $y^1$ of the outer kilns X and Y of curved slabs or arches extending from the side of each mouth or fireplace $a$. (See Fig 3).

Figure 2:
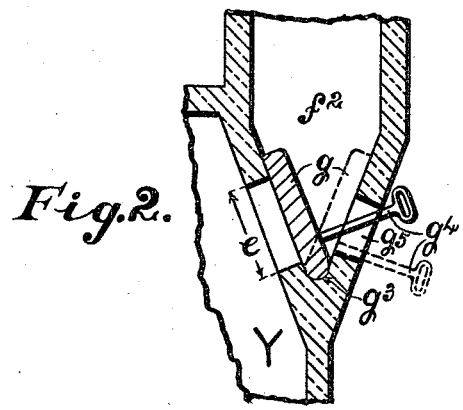
Fig. 2 is a sectional elevation illustrating a portion of the kiln to be hereinafter described.
Figure 4:
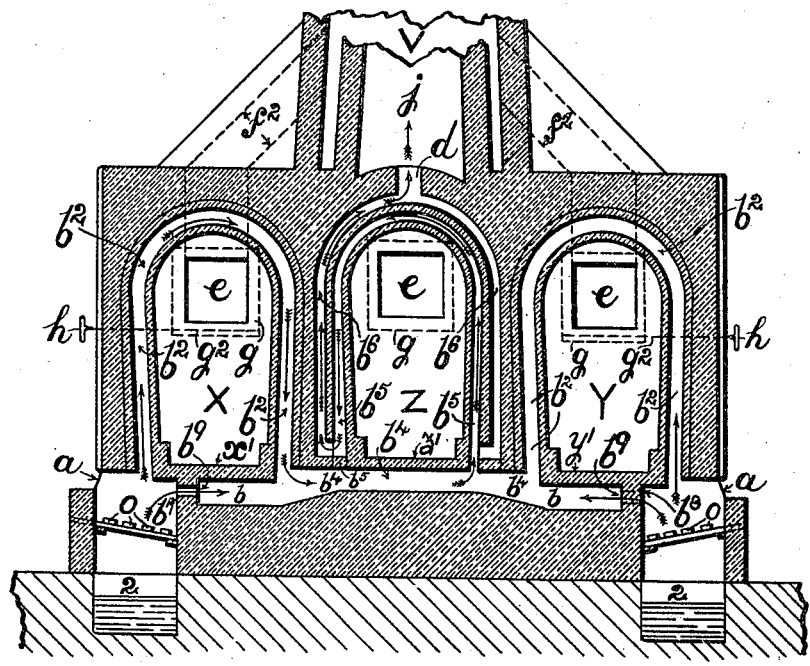
Fig. 4 is a similar view to Fig. 1 illustrating my improved kiln slightly modified.

The kiln shown at Fig. 4 is a slight modification of that shown at Fig. 1.

Instead of employing hinged dampers $r$ as described with reference to Fig. 1, I partly close up the flues $b$, at their inlet ends $b^7$ and $b^8$, said flues being approximately in alignment and in communication with flue $b^4$, a flame hole or passage $b^9$ being provided at the back of each mouth or firegrate $a$ into each flue $b$. Some of the flame from the mouths or firegrates $a$ travels through the flame holes or passages $b^9$ to heat the air which has traversed round each of the outside kilns X and Y. The hot air heated by the flame issuing through the flame hole or passage $b^9$ in each mouth first passes along flue $b^4$ underneath the central kiln Z, then round the flue $b^5$ being then directed up the flue $b^6$ and out of the flue $d$ into the cone or conduit $j$.

As before stated it is preferred to use the ordinary fire bars $o$ as shown at Fig. 4, the usual ash hole 2 being also provided.

What I claim as my invention and desire to secure by Letters Patent is:—

1. In firing apparatus of the class described, three kilns arranged side by side, a chimney common to the three kilns, the center kiln being provided with a horizontal heating flue extending under it and a heating flue extending around it and communicating with the said chimney at its outlet end and with the horizontal flue at its inlet end, and the outer kilns having heating flues extending around them and communicating at their outlet ends with the said horizontal heating flue, and fire-places arranged at the outer sides of the outer kilns and provided with flues extending under the outer kilns and communicating with the inlet ends of their said heating flues and with the said horizontal heating flue.

2. The combination, with a firing apparatus as set forth in claim 1, of means for regulating the passage of heat from the outlet ends of the fire-place flues into the horizontal flue under the center kiln.

3. The combination, with a firing apparatus as set forth in claim 1, of a conduit for the storage of heat arranged inside the chimney and communicating at its lower end with the outlet end of the heating flue of the center kiln and having a means for closing its upper end at will.

4. The combination, with a firing apparatus as set forth in claim 1, of three separate and independent passages which connect the firing chambers of the three kilns with the chimney, and separate means for closing each of the said passages at will.

5. The combination, with a firing apparatus as set forth in claim 1, of a conduit for the storage of heat arranged inside the chimney and communicating at its lower end with the outlet end of the heating flue of the center kiln and having a means for closing its upper end at will, three passages which connect the firing chambers of the three kilns directly with the chimney, and means for closing the said three passages at will.

In testimony whereof I have hereunto set my hand in the presence of two witnesses.

CHARLES FREDERICK BAILEY.

Witnesses:
  J. BENTON,
  J. H. COPSTAKE.